Jan. 1, 1946. C. R. KUTIL 2,391,982
CONVERTIBLE BICYCLE ATTACHMENT
Filed July 21, 1944

INVENTOR
Clyde R. Kutil
BY
Sam J. Slotsky
ATTORNEY

Patented Jan. 1, 1946

2,391,982

UNITED STATES PATENT OFFICE 2,391,982

CONVERTIBLE BICYCLE ATTACHMENT

Clyde R. Kutil, Sioux City, Iowa

Application July 21, 1944, Serial No. 545,914

2 Claims. (Cl. 280—293)

My invention relates to a two wheeled bicycle attachment.

An object of my invention is to provide an attachment for two wheeled bicycles which will readily convert the same to a vehicle similar to a tricycle.

A further object of my invention is to provide an easily attachable arrangement which can be removed as desired so that the arrangement will function as a simple two wheeled bicycle.

A further object of my invention is to provide an attachment which will freely and resiliently support the center rear wheel of the arrangement off of the ground until the arrangement is used when there is insured a positive application of power to the center rear wheel and for other obvious reasons.

A further object of my invention is to provide outer side wheels which are resiliently and independently supported to provide a smooth running action.

A further object of my invention is to provide means for providing adjustment between the center wheel and the outer wheels whereby their portions of contact can be spaced to any desired spacing vertically.

A further object of my invention is to provide an adjustable arrangement also whereby any desired size of outer wheels can be employed yet maintaining the resilient characteristics of the outer wheels as well as the necessary vertical spacing between such outer wheels and the center rear wheel.

A further object of my invention is to provide such an arrangement which can be attached to standard two wheeled bicycles, with further means for firmly supporting the arrangement.

A further object of my invention is to provide all of the above mentioned objects in a simple construction.

Figure 1:
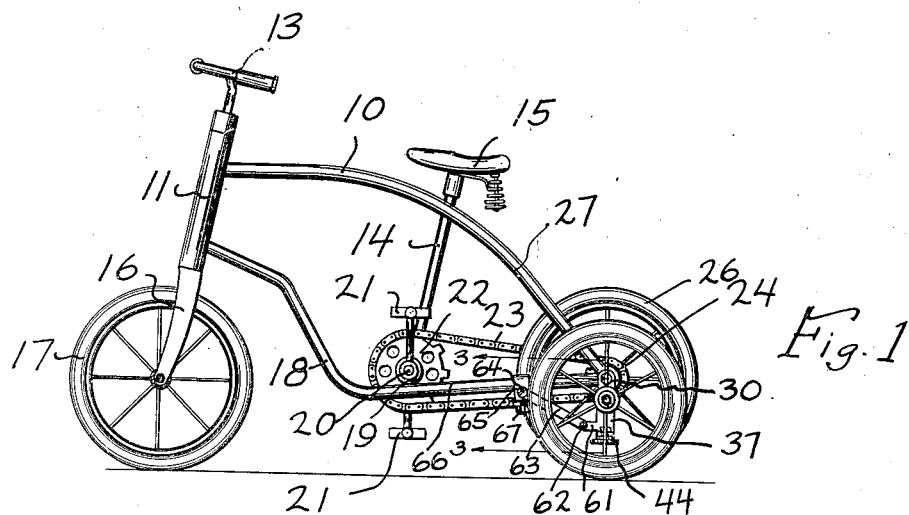
Figure 2:
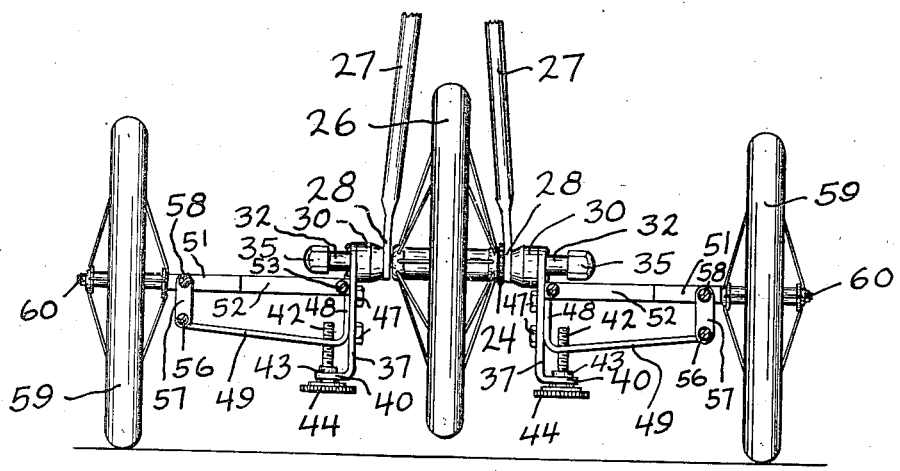
Figure 3:
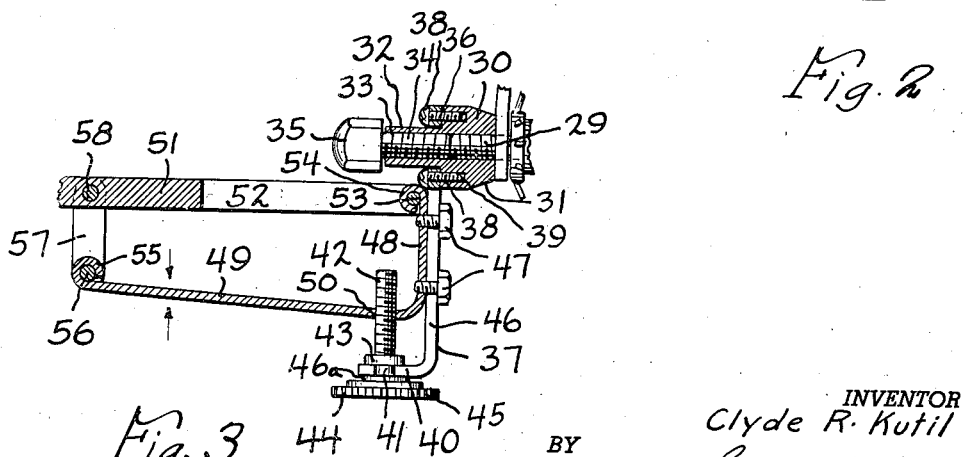

With these and other objects in view, my invention consists in the construction, arrangement, and combination of the various parts of my device, whereby the objects contemplated are attained, as hereinafter more fully set forth, pointed out in my claims, and illustrated in the accompanying drawing, in which:

Figure 1 is a side elevation of the arrangement as attached to a two wheeled bicycle, Figure 2 is an enlarged rear view of Figure 1, and Figure 3 is an enlarged sectional detail taken along the lines 3—3 of Figure 1.

I have used the character 10 to designate a portion of a bicycle framework having the head post 11, the handle-bars 13, a further supporting post 14, the seat 15, the forward fork 16 in which is journalled the forward wheel 17. Further portions of the framework are indicated by the character 18 to which is secured the bearing 19 which receives the shaft 20 driven by pedals 21. The shaft 20 drives the sprocket 22 which drives the chain 23 which drives the further sprocket 24 which in turn drives the rear wheel 26. The framework 27 includes the journalling portion at 28.

The foregoing structure represents a single two wheeled bicycle framework to which my structure is to be attached. Attached to the rear wheel 26 and to the hub portions thereof are the usual threaded shaft portions 29. Threadably engaged with such shaft portions, I provide a pair of members 30 engaged with both extending portions 29. Extending integrally from the members 30, which members are substantially cylindrical in shape and which include tapered portions 31, are the cylindrical portions 32 which include the threaded openings at 33 which receive the threaded screws 34 having hexagon heads 35. Attached to the surfaces 36 of the members 30 are downwardly extending supports 37 which are attached thereto by means of the machine screws 38 received in the threaded openings 39. The vertical members 37 terminate in the horizontal forks 40 which receive between them the stud portions 41 which extend into the integral threaded screws 42, and merging integrally with the threaded portions 42 are the limiting collars 43. Attached at the bottom of the screws 42 are circular turning handles 44 which include suitable indentations 45 with the restricted portions at 46a providing a minimum contact bearing. The vertical supporting members include the vertical slots 46, which slots 46 each receive a pair of supporting screws 47 which screws are threadably attached to the further vertical members 48. The members 48 are made of resilient material and extend into the substantially horizontal portions 49 which are threadably attached at 50 to the screws 42. A pair of spindle members 51 include the forks 52 through which pass the bolts 53, the members 48 including the curled portions 54 which receive the bolts 53. The other end of the spring members 49 are curled at 55 about further machine bolts 56 which are secured between the pairs of links 57, which links 57 are pivotally attached to the bolts 58, which bolts 58 pass through the portions 51. The portions 51 include circular journalling portions at the end thereof upon which are rotatably mounted the outer side wheels 59 which are secured by means of the nuts 60. Extending from the vertical members 37 are the ears 61 (see Figure 1) which are pivotally secured at 62 to the bars 63 which are attached at 64 to clamps 65 which clamps are secured to the bicycle framework portions 66 by means of the machine screws 67. This double arrangement of brackets provide a firm retention of the entire structure in addition to the other clamping arrangements.

It will now be seen from the foregoing description that the side wheels can be attached by simply first screwing the members 30 on the extending threaded studs 29, and if desired by rotating the entire structure until the members 37 are in the vertical position, and then attaching the clamps 65. Any variation of the members 37 from the vertical can be accommodated by means of the screws 34 which are screwed into place and which will engage the ends of the portions 39 thereby acting as locks, as well as additional bracing means as well as strengthening the supporting means from the extending shaft portions 29. The normal position of the arrangement is as shown in Figure 2 with the center wheel 26 being off of the ground level, which however will contact the ground when the rider is seated. The members 49 provide a spring resiliency which allows either of the side wheels 59 to travel over objects in the path thereof without destroying the driving efficiency of the center wheel. This spring arrangement also permits turning of corners, and a certain amount of lateral movement of the central frame of the cycle, as well as other advantages. The bolts 47 provide a firm support with the spring action occurring through the spring members 49 and the links 57.

Any desired adjustment is provided by turning the circular handles 44 which correspondingly raises or lowers the members 51 so that the positioning of the wheel 26 with respect to the wheels 59 can be regulated. The principal feature of this adjustment however is in that event where it is desired to employ varying sizes of wheels 59 on a standard arrangement whereby the use of the threaded screws 42 and the handles 44 can be effected to correspondingly adjust for such varying sizes of wheels 59 and still maintain the desired clearance between the wheels, since turning of the screws 42 will raise or lower the members 51 to compensate therefor. The structure carrying the side wheels 59 can be disassembled from the studs 29 in the reverse manner so that the arrangement can be used as a two wheeled bicycle when desired. It should be noted that the screws 47 are vertically movable through the slots 46, and can be tightened after the adjustment is made.

It will now be seen that I have provided the various advantages set forth in the objects of my invention with various other advantages being readily apparent.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

1. A convertible bicycle attachment for two wheeled bicycles comprising a pair of side wheels spaced laterally from the rear center wheel of the two wheeled bicycle, means for resiliently supporting said laterally spaced wheels including a pair of flat spring members, frames supporting said spring members, means secured to said frames for attaching the frames to the extending shaft portions of said center rear wheel, including a pair of threaded securing members threadably engaged with said extending shaft portions, said frames being attached to said securing members, a pair of locking studs threadably engaged into said securing members for abutment against said wheel shaft extensions to provide locking and supporting means therefor, supporting braces attached to said securing members, said flat springs attached to said braces, means for adjustably moving said flat springs vertically with respect to said braces to provide vertically spaced adjustment between said center, and said outer wheels, said adjusting means including a threaded stud rotatably secured in said braces, said stud being threadably engaged with said flat springs, links pivotally attached at the outer end of said springs, supports upon which said outer wheels are journalled, the upper ends of said links being pivotally attached to said supports, the inner ends of said springs being attached at the inner ends of said supports.

2. A convertible bicycle attachment for two wheeled bicycles comprising a pair of side wheels spaced laterally from the rear center wheel of the two wheeled bicycle, means for resiliently supporting said laterally spaced wheels including a pair of flat spring members, frames supporting said spring members, means secured to said frames for attaching the frames to the extending shaft portions of said center rear wheel, including a pair of threaded securing members threadably engaged with said extending shaft portions, said frames being attached to said securing members, a pair of locking studs threadably engaged into said securing members for abutment against said wheel shaft extensions to provide locking and supporting means therefor, supporting braces attached to said securing members, said flat springs attached to said braces, means for adjustably moving said flat springs vertically with respect to said braces to provide vertically spaced adjustment between said center, and said outer wheels, said adjusting means including a threaded stud rotatably secured in said braces, said stud being threadably engaged with said flat springs, links pivotally attached at the outer end of said springs, supports upon which said outer wheels are journalled, the upper ends of said links being pivotally attached to said supports, the inner ends of said springs being attached at the inner ends of said supports, braces attached between said frames and the bicycle frame to rigidify the frames.

CLYDE R. KUTIL.